March 5, 1940.                S. F. GLEASON                2,192,225
                     MEAT MOLDING AND PROCESSING DEVICE
                         Filed Nov. 14, 1938        2 Sheets-Sheet 1

INVENTOR
Stanley F. Gleason
BY
Louis Necho
ATTORNEY

March 5, 1940. S. F. GLEASON 2,192,225
MEAT MOLDING AND PROCESSING DEVICE
Filed Nov. 14, 1938 2 Sheets-Sheet 2

INVENTOR
Stanley F. Gleason
BY
Louis Necho
ATTORNEY

Patented Mar. 5, 1940

2,192,225

UNITED STATES PATENT OFFICE 2,192,225

MEAT MOLDING AND PROCESSING DEVICE

Stanley F. Gleason, Philadelphia, Pa.

Application November 14, 1938, Serial No. 240,313

6 Claims. (Cl. 53—22)

My invention relates to a new and useful meat processing and molding device of the type employed in the packing industry for cooking, molding or otherwise treating or processing boned meats such as hams, shoulders, "picnics", and such other boned and fatted meats that are commonly processed and molded in a container of the type disclosed in my prior Patent No. 2,107,329.

My invention further relates to a device of this character which is of an extremely simplified and serviceable construction whereby the initial cost of manufacture, as well as the cost of maintenance in cleaning, is reduced, and whereby the device as a whole will be in strict conformity with such laws as are provided for regulating, packing and processing of meats.

My invention still further relates to a device of this character by means of which equalized and constantly self-equalizing pressure is automatically applied to the meat or meat product being processed without the necessity of any subsequent tension, variation or adjustment once the meat product has been placed in the device and the device has been closed in the proper manner.

My invention still further relates to a meat processing device in which guides are provided for the springs exerting the pressure on the cover or following member to prevent longitudinal displacement of the springs thus guarding against any possible inequality in the pressure exerted, and in which, for the same purpose, other guide means are provided for preventing tilting or vertical displacement of the cover or following member under tension of the pressure-applying springs, whereby a constantly uniform and self-equalizing following pressure is exerted upon the initially, irregular or non-uniform mass of meat placed in the device, so that, as the meat is processed and softened, it is forced into a uniform and homogeneous mass conforming to the shape and contour of the device.

My invention still further relates to a meat cooking device which, for practical purposes, is formed of what may be termed as two units, one unit being the container for reception of the meat to be treated and the other unit comprising an integrated assembly of the following member, the cover, the pressure-exerting springs and the clamping or retaining members, said mechanism being adapted for automatic application by a single operation.

Other features of novelty and construction will be more clearly understood from the following specification and the accompanying drawings in which.

Figure 1:
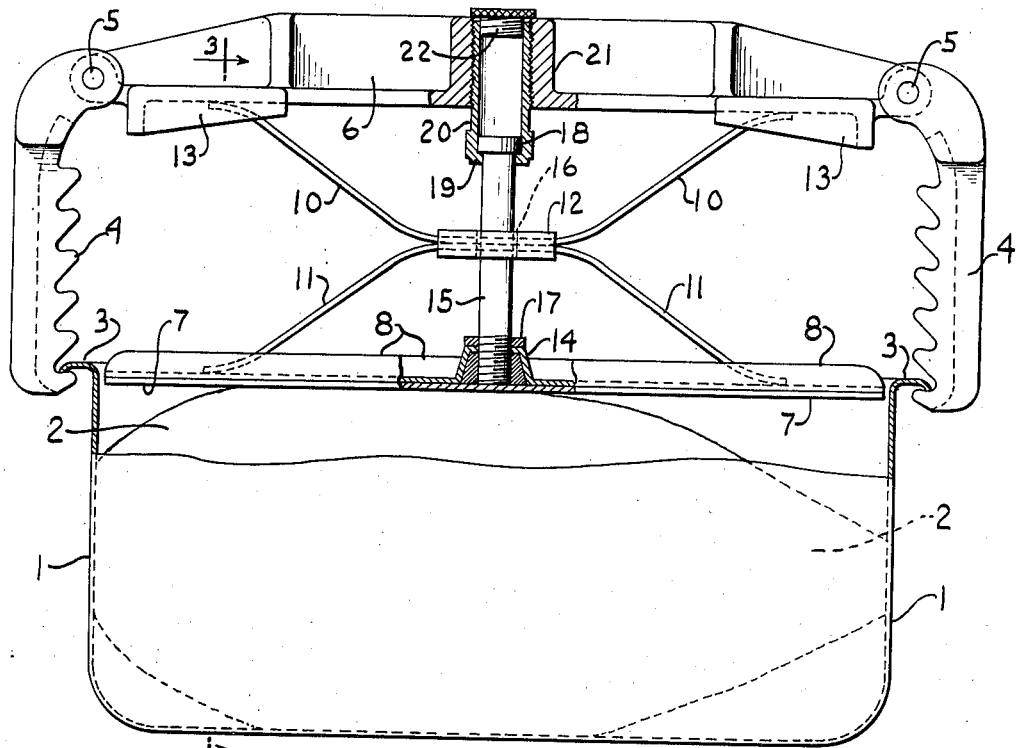
Fig. 1 represents a side elevation partly in section of a meat processing device embodying my invention, the same being shown in "open" position, that is, before it is clamped down upon the meat therein.
Figure 3:
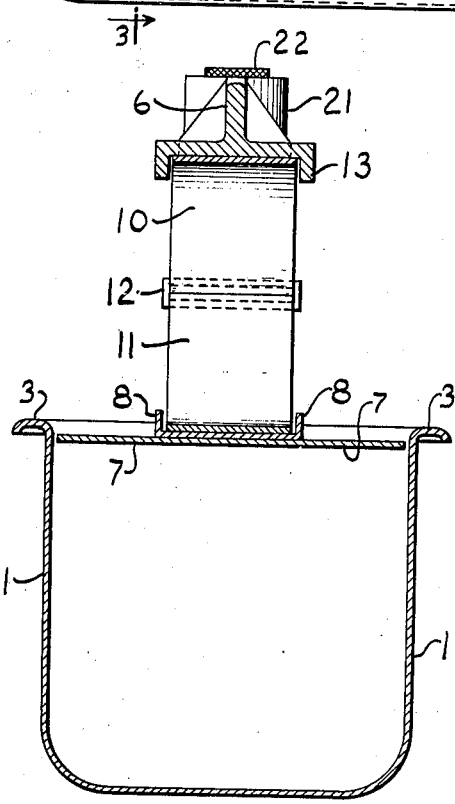
Fig. 3 represents a section on line 3—3 of Fig. 1.

Referring to the drawings in which like reference characters indicate like parts, and more particularly to Fig. 1, my novel meat processing and molding device comprises a container 1 of the desired dimensions and shape adapted to receive the meat to be treated 2. As shown in the drawings the meat is represented as being a ham, but it is to be understood that any other boned meat or meat product can be treated if desired. The container 1 is provided with the peripheral flange or turned-down rim 3 which is adapted to be engaged by the coacting ratchets 4. The ratchets 4 are pivoted at 5 to the cross bar or supporting member 6. 7 designates a cover or follower plate which contacts the meat being processed and which is provided on its upper surface with the guiding and stiffening channel 8. The channel 8 may be suitably secured to the cover 7 by any suitable means such as spot-welding, riveting, or the like. 10 and 11 designate oppositely deflected flat springs which are united about their center by the clip 12 with the opposite ends of the lower spring 11 guided in the channel 8 and slidably bearing against the top of the cover 7. The opposite ends of the upper spring 10 are similarly guided in the pockets or channels 13 formed on the underside of the cross bar 6, it being understood that the ends of the upper spring 10 are slidable within the channels or pockets 13 along the under surface of the cross bar 6. In the center of the cover 7 and preferably extruded integrally from the channel member 8 is formed the hub 14 into which is threadedly or otherwise secured the guide pin 15 which passes through an opening 16 in the spring clip 12. The pin 15 may be suitably locked in place by the lock nut 17 or the like. The upper end of the guide pin 15 is provided with a shoulder 18 which, by engaging the bottom shoulder 19 of the sleeve 20, limits the downward movement of the guide pin 15. By this means the maximum expansion of the springs is limited to a predetermined position in which the springs 10 and 11 are always in constant engagement under partial tension. The sleeve 20 is threaded or otherwise secured in the hub 21 formed in the cross bar 6 and it is retained in place by the lock nut 22 or the like which also serves as an upper stop to limit the upper movement of the pin 15 and thus limit the maximum compression of the spring or closure of the device to guard against undue compression of the spring which may result in damage thereto.

Figure 2:
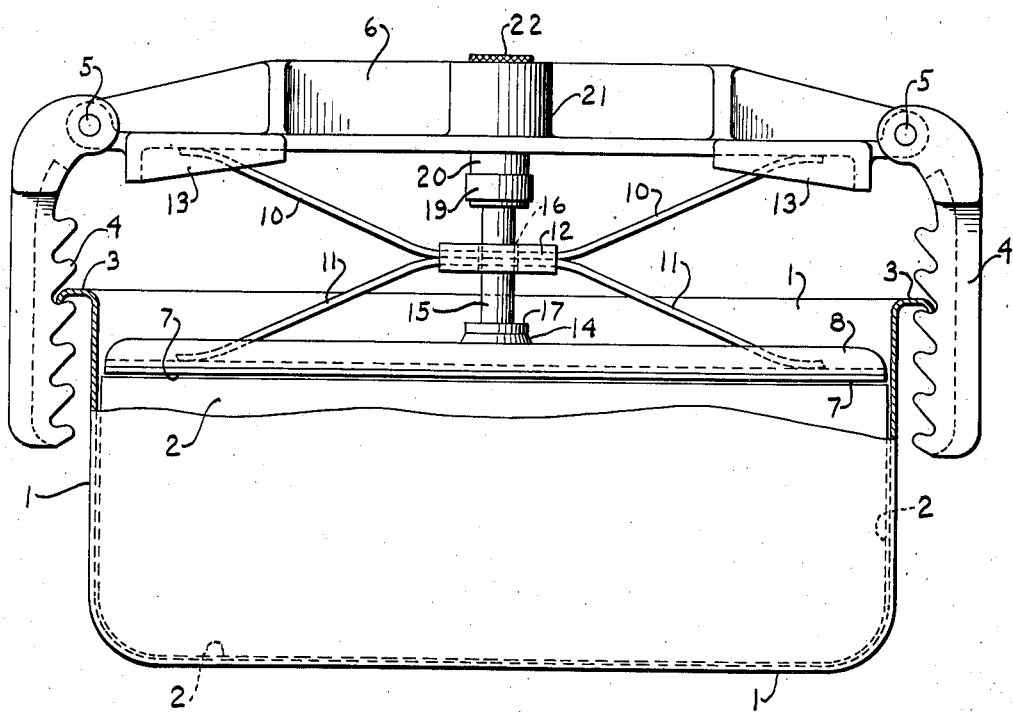
Fig. 2 represents a view similar to Fig. 1 showing the device as having been compressed, with the meat in proper position.

The operation is as follows:

The ham 2 or similar meat to be treated, which, in most cases, is of a non-uniform or irregular shape, is placed in the container 1 and with the ratchets 4 disengaged from the rim or flange 3 the cover plate 7 is positioned over the meat 2 and the preassembled, pressure-applying assembly is placed in position with the cover 7 resting upon the meat 2. Pressure is then applied upon the cross bar 6 thus compressing the springs 10 and 11 and bringing the ratchets 4 downwardly into engagement with the flange or rim 3 as shown in Fig. 2. When engaging the ratchets 4 with the flange 3, it is important to have the corresponding teeth of the opposite ratchets engaging the adjacent portion of the rim or flange 3. By this uniform compression of the springs 10 and 11 over the initial non-uniform meat 2 placed in the container, more pressure is exerted upon the butt end of the meat than on the thin shank thereof, so that, as the meat softens during the processing thereof, the mass of said meat is displaced gradually until it is a uniform, homogeneous mass conforming to the contour of the container 1.

In order to insure against the tendency of the cover or follower member 7 to tilt or be inclined, horizontally speaking, due to the presence under one end thereof of the relatively thick, non-yielding butt end of the meat while the shank of the meat is under the opposite end of the following member 7 I have provided the guide pin 15 which passes through the spring clip 12 which insures a constant horizontal position of the follower plate 7 during the entire processing operation.

It will be noted that the following pressure exerted by the springs 10 and 11 is continuous throughout the processing operation by which is meant, not only the heat treatment for cooking and processing the meat but also the step of chilling the meat and its congealing after the cooking process proper has been completed.

Having thus described my invention, what I claim as new and desire to secure by Letters Patent is:

1. A meat molding and processing device comprising a container adapted to receive the meat to be treated, a follower member adapted to contact the meat and to serve as a cover for said container, a channel on the outer face of said follower member, a cross bar having pockets formed in the inner face thereof, oppositely disposed flat springs confined between said follower member and the inner face of said cross bar, the opposite end of said springs being slidable in and guided by said channel and said pockets to prevent lateral displacement thereof, means for clamping the central portion of said springs together and a guide pin secured at its lower end to said cover and slidably engaging said cross bar and said central portions of said springs.

2. A meat molding and processing device comprising a container adapted to receive the meat to be treated, a follower member adapted to contact the meat and to serve as a cover for said container, a channel on the outer face of said follower member, a cross bar having pockets formed in the inner face thereof, oppositely disposed flat springs confined between said follower member and the inner face of said cross bar, the opposite end of said springs being slidable in and guided by said channel and said pockets to prevent lateral displacement thereof, means for limiting the movement of said springs, means for clamping the central portions of said springs together, a guide pin secured at its lower end to said cover and slidably engaging said cross bar and said central portions of said springs, and means for limiting the relative movement of said cross bar with respect to said container.

3. A meat molding and processing device comprising a container adapted to receive the meat to be treated, a follower member adapted to contact the meat and to serve as a cover for said container, a channel on the outer face of said member, a cross bar having pockets formed in the inner face thereof, oppositely disposed flat springs confined between said follower member and the inner face of said cross bar, the opposite end of said springs being slidable in and guided by said channel and said pockets, and a pin secured at one end thereof to said channel and passing through said springs, said pin having a sliding relation to said springs and said cross bar.

4. In a meat molding and processing device, a container adapted to receive the meat to be treated, a follower member adapted to contact the meat being treated and to serve as a cover for said container, a cross bar, ratchets at the end of said cross bar for adjustably engaging said container, a sleeve carried by said cross bar and extending towards said follower member, a pin secured to said follower member and reciprocating within said sleeve, flat springs slidably mounted on said pin and confined between said cross bar and said follower member for exerting constant yielding pressure on the latter, the ends of said springs slidably bearing against the juxtaposed areas of said cross bar and said follower member, and means for guiding the movement of the ends of said springs.

5. A meat molding and processing device comprising a container adapted to receive the meat to be treated, and a pre-assembled pressure-applying mechanism for exerting a constant yielding pressure on said meat including, a follower member adapted to contact the meat being treated, a cross bar, a pin secured to said follower member and slidably engaging said cross bar, a flat spring assembly confined between said cross bar and said follower member and slidable on said pin, and means for clamping said cross bar to said container against the compression of said spring assembly.

6. A meat molding and processing device comprising a container adapted to receive the meat to be treated, a follower member adapted to contact the meat and to serve as a cover for said container, a channel on the outer face of said follower member, a cross bar, ratchets at the ends of said cross bar for adjustably engaging the rim of said container, there being guide pockets formed in the inner face of said cross bar, a sleeve carried by said cross bar and projecting towards said follower member, a pin slidably mounted in said sleeve, said pin being also secured to said follower member, oppositely disposed flat springs slidably mounted on said pin, the opposite ends of said respective springs sliding in and being guided by said channel and said pockets, and means for limiting the movement of said pin within said sleeve for predetermining the maximum compression and expansion of said springs.

STANLEY F. GLEASON.